June 26, 1945.  O. E. ROSEN  2,379,037
HYDRAULIC TRACER
Filed May 13, 1943  2 Sheets-Sheet 1

INVENTOR.
Oscar E. Rosen
BY
Swan, Frye & Hardesty
Attorneys.

June 26, 1945.     O. E. ROSEN     2,379,037
HYDRAULIC TRACER
Filed May 13, 1943     2 Sheets-Sheet 2

INVENTOR.
Oscar E. Rosen
BY
Swan, Inger, & Hardesty
Attorneys.

Patented June 26, 1945

2,379,037

UNITED STATES PATENT OFFICE 2,379,037

HYDRAULIC TRACER

Oscar E. Rosen, Detroit, Mich.

Application May 13, 1943, Serial No. 486,842

5 Claims. (Cl. 90—62)

The present invention relates to hydraulic tracers for duplicating machines and specifically to a tracer active to control the movement of the machine in one direction.

In certain types of cutting machines, e. g., wherein the movable slide carrying the cutter is quite heavily constructed, movement of the cutter carrying slide toward the work is through the action of gravity while its movement away from the work is accomplished by the use of hydraulic pressure. Usually such hydraulic pressure means is so arranged that locking the hydraulic fluid against movement results in locking the slide against movement.

The present invention has among its objects a hydraulic tracer applicable to such machines to convert them into highly satisfactory duplicating machines for the reproduction of patterns, models, etc.

Another object is a simply constructed tracer which controls the relative movement of the cutter and work efficiently and with a high degree of accuracy, but contains a minimum of moving parts.

Other objects and advantages will be apparent to those skilled in the art upon reference to the following description and the accompanying drawings in which Figure 1 is a diagrammatic view indicating the use of the tracer with a milling machine.

Figure 1:
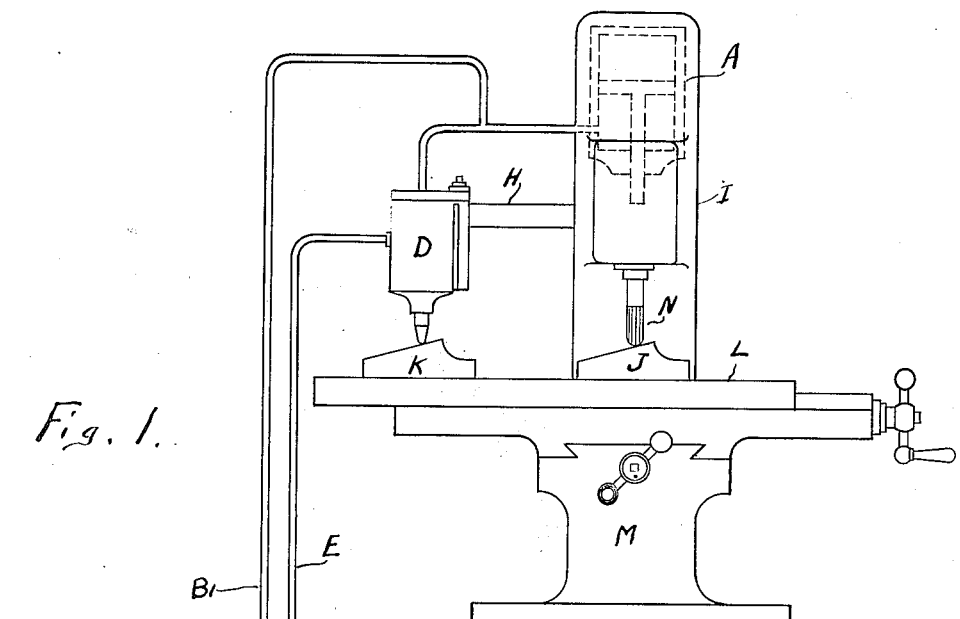
Figure 2:
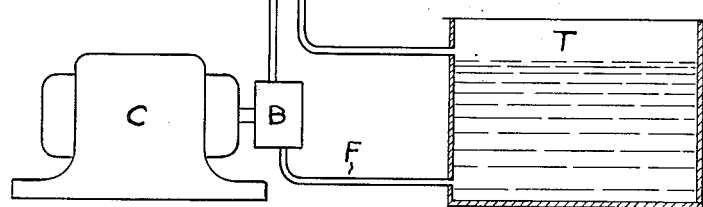
Figure 2 is a similar view simplified.
Figure 2:
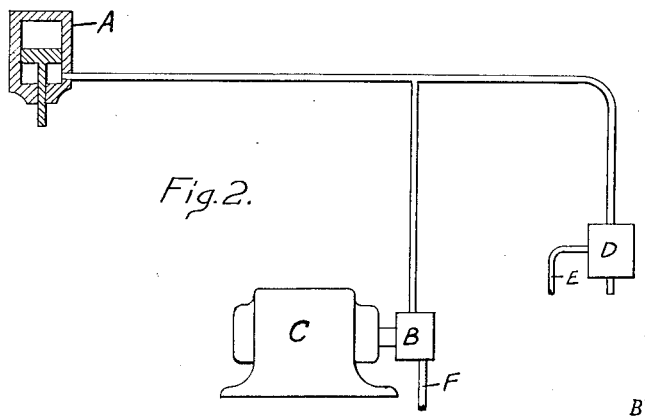

In the drawings there is indicated in Figure 1 one of the uses of the tracer with a milling machine indicated as a whole by M. This is provided with a horizontally movable slide L upon which is mounted a pattern K and workpiece J.

The machine M is also provided with an upright portion carrying a vertically movable slide I upon which is fixed an arm H carrying the tracer D. The vertical slide also of course carries the cutting tool N, the relative positions of the tool N and tracer D being the same as the relative positions of the work J and the pattern K.

Fixed to the vertical slide in such manner as to produce vertical motion of the slide is a pressure cylinder and piston A, fluid under pressure being supplied thereto from tank T through conduits F and B1 from a pump B driven by a motor C, while a controlled proportion of the fluid is bled from the line B1 through the tracer D and back to the tank T. Variation of the bleeding of the fluid from the line B1 will cause the vertical slide, carrying the tracer and cutter, to move up or down, the "down" movement being caused by gravity and excess bleeding while the "up" movement is caused by restricting the bleeding. Control of such bleeding is accomplished by the tracer D in conjunction with the pattern A as the latter is moved horizontally.

Figure 3:
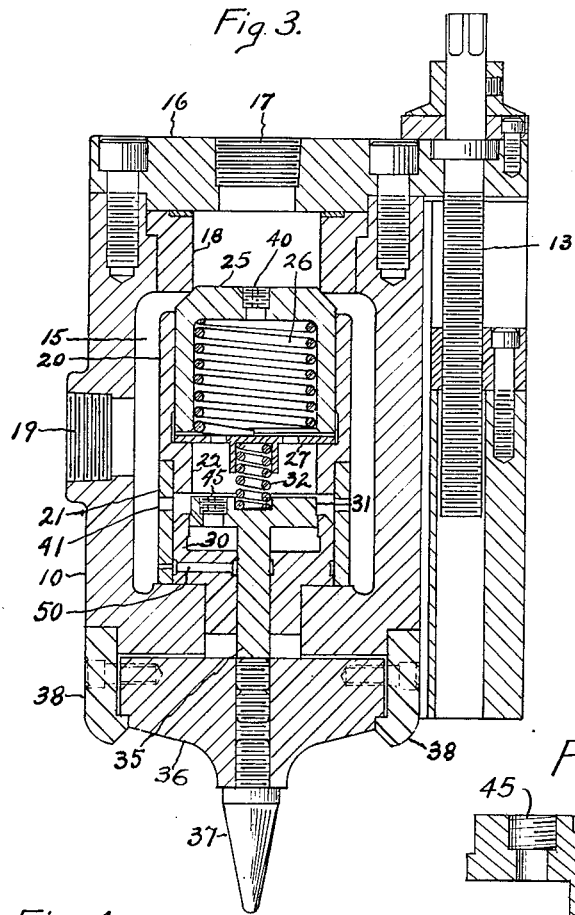
Figure 3 is a vertical section of the tracer on the line 3—3 of Figure 4.
Figure 5:
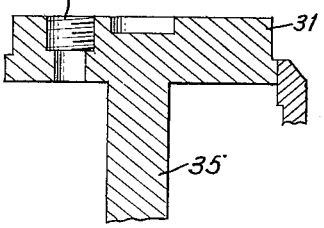
Figure 5 is an enlarged view of a portion of Fig. 3.
Figure 4:
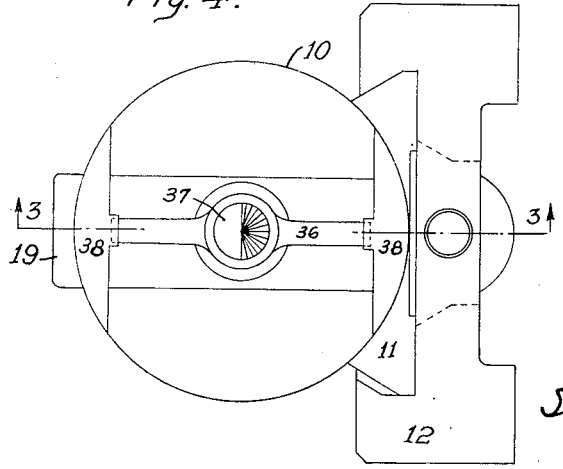
Figure 4 is a bottom view of the tracer.

A suitable tracer for such a machine is shown in the sectional view in Figure 3. In this figure there is shown a suitable casing 10 provided on one side with a dovetail portion 11 slidable vertically in the grooved slide member 12 and adjustable through the use of the screw 13.

The casing 10 is bored longitudinally to provide an oil chamber 15 and covered by means of a suitable cover 16 through which may be provided the oil inlet 17. Within the casing and around the inlet 17 is a valve seat member 18 and a suitable oil outlet 19 is indicated as leading from the chamber 15.

Within chamber 15 and of somewhat smaller diameter than the chamber is a valve structure which consists of an upper and lower portions 20 and 21 respectively, these being in axial alignment and the upper portion preferably being provided with a restricted lower end 22 nesting in the lower portion 21. The upper portion 20 serves as a guide member for a valve 25 adapted to cooperate with the valve seat 18 pressed upwardly against the seat by means of a suitable spring 26. This spring acts against a perforated plate 27 which is itself seated on a suitable shoulder provided by the restricted lower portion 22.

Within the lower portion 21 of the valve structure is a cylindrical guide member 30 for a second valve 31 movable longitudinally of the valve structure to cooperate with the lower restricted portion 22 which acts as a valve seat for the valve 31. A suitable spring 32 acts between the second valve 31 and the plate 27 above mentioned.

The valve 31 is provided with a stem 35 which extends from the lower end of the guide member 30 where its flattened or slightly rounded end contacts with the upper surface of a block 36 upon which is mounted a tracer point 37. This block 36 is slidable between cooperating guide portions 38 secured to the outside of the casing 10 while the block and guide 38 are of such dimensions as to permit a small amount of vertical or tilting movement of the block.

The spring 26 and the valve 25 are preferably so adjusted that there will be permitted through the tracer a sufficient flow of oil to cause the tool carrying slide to move upward slowly. In order, however, to maintain the slide at a proper level, a further flow of fluid is permitted through the tracer by a restricted passage through the valve 25 itself.

In the construction shown, a tapped hole 40 is formed in the head of valve 25 and in this a small bushing is secured, the bushing having an opening of suitable size. This allows a restricted flow of fluid through the valve 25 into the chamber within the valve 25, which chamber communicates with that formed by extending the guide 20 for a short distance below the end of valve 25. This chamber is provided with an outlet 41 below the end of the extension and the valve seat 22 so that movement of the valve 31 will vary the flow of fluid through the openings 40 and 41.

Further in order to make the movement of valve 31 sensitive to slight pressure upon the tracer finger 37, it is provided with a small restricted passage 45 leading from above the valve to the guide cylinder 30 below the valve and in order that the pressure balance may be accurate, the valve 31 is stepped on its outer periphery so that the area exposed to fluid pressure above is equal to the area exposed to fluid pressure below said valve, that is, the diameter of the underside of valve 31 is enough greater than the diameter of the upper side to compensate for the cross sectional area of stem 35.

The passage 50 leads from the chamber 15 to the guide for stem 35 whereby to lubricate the latter.

In the operation of the tracer, assuming that the tracer finger 37 is not touching the pattern, the valve 31 is in its lowest position and therefore fully open. Further, in such case, the valve 25 will also be open and fluid from pump B will pass between the latter and its seat and also through openings 40 and 41. Under these conditions the back pressure in line B1 and therefore under piston will be insufficient to support the tool slide and tracer. These latter will therefore descend slowly until they touch the work and pattern respectively.

Such contact will move the tracer finger and with it the valve 31 upwardly, thereby restricting the flow through openings 40 and 41. This causes the back pressure to build up in B1 and under piston A and stops the downward movement of the tool slide and tracer.

Only a small movement of the valve 31 is required to produce a balanced condition wherein the tool slide and tracer move neither up or down. Additional pressure, however, on the finger 37 not only further restricts the flow through passage 40 but through the action of spring 32 moves the valve 25 firmly against the seat 18 and thereby reduces or stops the flow past valve 25 and causes rapid upward movement of the piston in A.

Having now disclosed the invention, what I claim is:

1. Hydraulic tracer mechanism consisting of a casing having means for mounting on a suitable support and having fluid inlet and outlet means, a spring pressed valve normally closing said inlet, said valve when open allowing flow directly from said inlet to said outlet, a bleed passage leading from said inlet to said outlet, a second valve controlling said bleed passage, a movable tracer finger connected to said second valve and adapted to move said valve to thereby vary the capacity of said bleed passage.

2. Hydraulic tracer mechanism consisting of a casing having inlet and outlet means for fluid, means in said casing defining two passages from said inlet to said outlet, a spring actuated valve for controlling one of said passages, means providing a predetermined restricted flow through the other of said passages, a tracer finger, and a second valve operable by said finger for varying the fluid flow through said other passage.

3. Hydraulic tracer mechanism consisting of a casing having inlet and outlet means for fluid, means in said casing defining two passages from said inlet to said outlet, a spring actuated valve for controlling one of said passages, means providing a predetermined restricted flow through the other of said passages, a tracer finger, a second valve operable by said finger for varying the fluid flow through said other passage, and means for balancing the pressure on both sides of said second valve.

4. Hydraulic tracer mechanism consisting of a casing having inlet and outlet means for fluid, means in said casing defining two passages from said inlet to said outlet, a spring actuated valve for controlling one of said passages, means providing a predetermined restricted flow through the other of said passages, and a piston valve having a stem arranged in operative relation with said tracer finger and movable thereby to vary the fluid flow through said other passage.

5. Hydraulic tracer mechanism consisting of a casing having inlet and outlet means for fluid, means in said casing defining two passages from said inlet to said outlet, a spring actuated valve for controlling one of said passages, means providing a predetermined restricted flow through the other of said passages, and a piston valve having a stem arranged in operative relation with said tracer finger and movable thereby to vary the fluid flow through said other passage, said piston valve being provided with means for balancing the fluid pressure on both sides thereof.

OSCAR E. ROSEN.